Dec. 29, 1964     A. A. LUTSKY     3,163,044
THERMAL SENSING ELEMENT

Filed Oct. 23, 1961     3 Sheets-Sheet 1

INVENTOR.
ARTHUR A. LUTSKY
BY
ATTORNEY

Dec. 29, 1964    A. A. LUTSKY    3,163,044
THERMAL SENSING ELEMENT
Filed Oct. 23, 1961    3 Sheets-Sheet 2
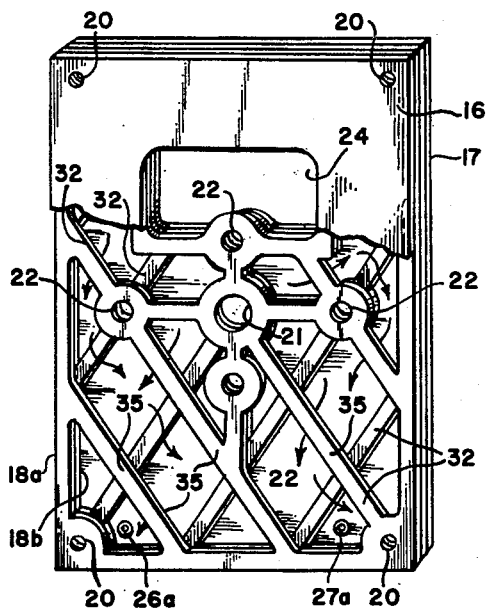
Fig. 4
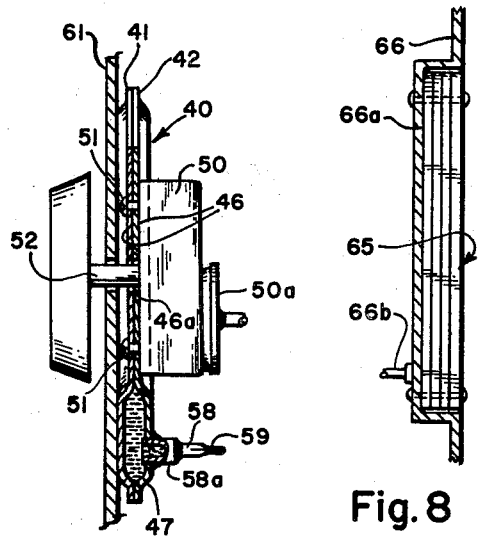
Fig. 6
Fig. 8
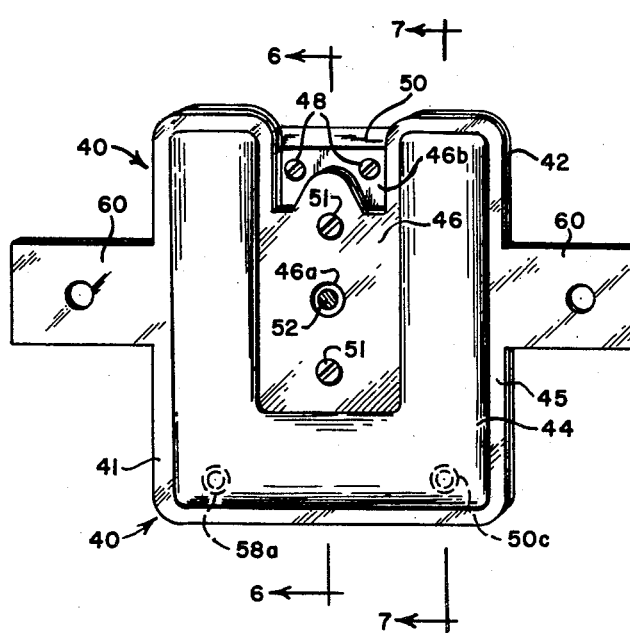
Fig. 5
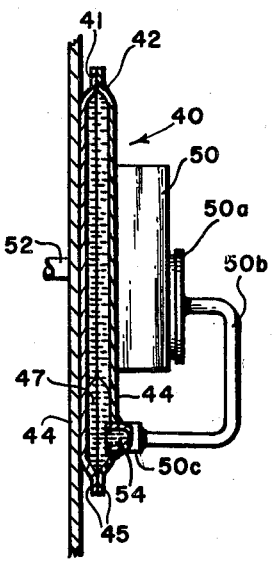
Fig. 7
INVENTOR.
ARTHUR A. LUTSKY
BY
ATTORNEY Dec. 29, 1964   A. A. LUTSKY   3,163,044
THERMAL SENSING ELEMENT
Filed Oct. 23, 1961   3 Sheets-Sheet 3

INVENTOR.
ARTHUR A. LUTSKY
BY
ATTORNEY

United States Patent Office 3,163,044
Patented Dec. 29, 1964

3,163,044
THERMAL SENSING ELEMENT
Arthur A. Lutsky, Newark, N.J., assignor to The Wilcolator Company, Elizabeth, N.J., a corporation of New Jersey
Filed Oct. 23, 1961, Ser. No. 146,794
12 Claims. (Cl. 73—368)

This invention relates to improvements in thermal sensing elements for use as a part of power means of the type comprising an expansible element such as a diaphragm or bellows in communication with a thermal sensing element, the expansible and sensing elements containing a fluid which expands and contracts upon increases and decreases in temperature so as to cause distention of the expansible element for operation of switches, valves, and the like. More particularly, the invention is directed to the provision of a thermal sensing element which provides a more sensitive and rapid response to temperature changes than have been provided by the conventional bulb type sensing element, and which may be manufactured from less costly materials and in a variety of space saving configurations.

It is a principal object of the present invention to provide a particulalry sensitive thermal sensing element of the above mentioned character comprising a plurality of metal plates which, when superimposed and secured together, form a chamber or cavity therebetween for expansible fluid, which cavity is defined by two closely spaced oppositely disposed relatively large wall areas for confining a given volume of the expansible fluid as compared to conventional bulb type sensing elements, the large wall areas affording efficient and rapid transfer of heat to and from the relatively thin body of fluid within the cavity.

Another object of this invention is the provision of a thermal sensing element composed of a set of intermediate grid-like plates sandwiched between a pair of end plates, the grid-like plates cooperating with one another and with the end plates to provide a rigid, relatively large wall area chamber, the nature of the intermediate plates readily permitting the construction of sensing elements with chambers of differing volumes. In the practice of the invention the grid-like plates are preferably formed as identical metal stampings having an asymetrical pattern of openings therein so that when one plate is reversed and superimposed on another plate prior to sandwiching between the end plates, the openwork will provide a series of interconnecting fluid passages between the end plates, the passages thereby forming a continuous cavity, the volume of which may be determined by selecting intermediate plates of the necessary thickness or by including one or more additional intermediate plates. The plates are preferably formed from sheet metal such as cold rolled steel and are coated with a bonding material such as soft or silver solder, or copper, and are clamped together and then bonded by application of brazing heat in a furnace.

One objection to prior art thermal sensing elements formed of metal stampings has been that the sheet metal components tend to flex with changes in internal pressures thereby causing inaccuracies in response. Accordingly, it is another object of the present invention to provide a composite thermal sensing element having a plurality of grid-like plates, the grid bars of which, when superimposed, intersect to provide a pattern of solid connections between all components, thereby lending great rigidity to the sensing element.

As another object this invention aims to provide thermal sensing elements of composite construction wherein the fluid chamber or cavity is so arranged that a control device may be mounted directly on the sensing element with a control shaft extending through the element and between portions of the cavity.

Other objects and advantages of thermal sensing elements embodying the present invention will become apparent from the following detailed description of presently preferred embodiments thereof taken in conjunction with the accompanying sheets of drawings forming a part of this specification, and in which;

FIG. 4 is a view of the thermal sensing element with a portion of one end plate broken away;

FIG. 5 is a front view of another embodiment of composite thermal sensing element;

FIG. 6 is a sectional view of the embodiment of FIG. 5 taken along line 6—6 thereof;

FIG. 7 is a sectional view taken along line 7—7 of FIG. 5;

FIG. 8 is a side elevation of another embodiment of the invention, mounted in an oven wall shown in section;

Figure 1:
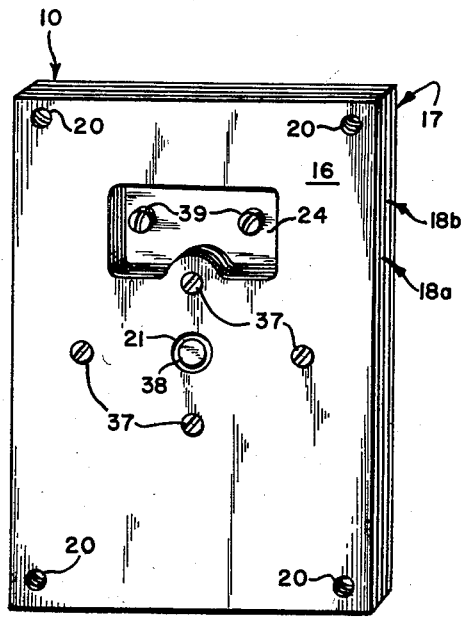
FIG. 1 is a front elevation of a thermal sensing element embodying the invention and shown in association with a control device which may be operated thereby.
Figure 2:
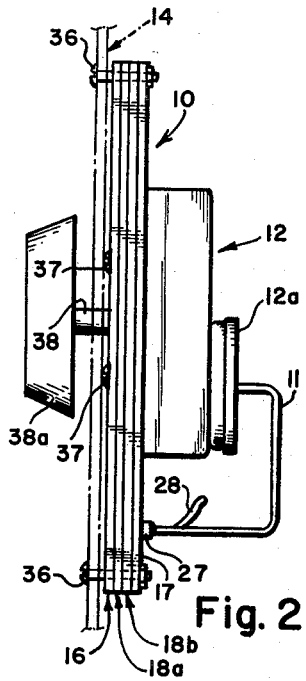
FIG. 2 is a side elevation of the thermally responsive element and control device of FIG. 1.

In the form of the invention illustrated in FIGS. 1 through 4, a thermal sensing element 10, described more fully hereinafter, is connected by a tube 11 to an expansible member or bellows 12a of a bellows operated control switch 12 mounted directly on the sensing element. Sensing element 10, tube 11, and bellows 12a contain a suitable fluid which causes expansion and contraction of the bellows so as to operate the switch upon increases and decreases in temperature sensed by element 10. While thermal sensing elements embodying the invention may be made in many other shapes and configurations, the thermal sensing element 10 is flat and generally rectangular in shape, and may be conveniently mounted on a panel or oven wall 14, for example, so as to operate switch 12 to control energization of the oven heating element (not shown) in accordance with the variations in temperature of the oven.

Sensing element 10 comprises a stack of plate elements including end plates 16 and 17 with a plurality of intermediate grid-like plates 18a and 18b sandwiched therebetween to form a fluid chamber or cavity in a manner which will become apparent as the description proceeds.

Figure 3:
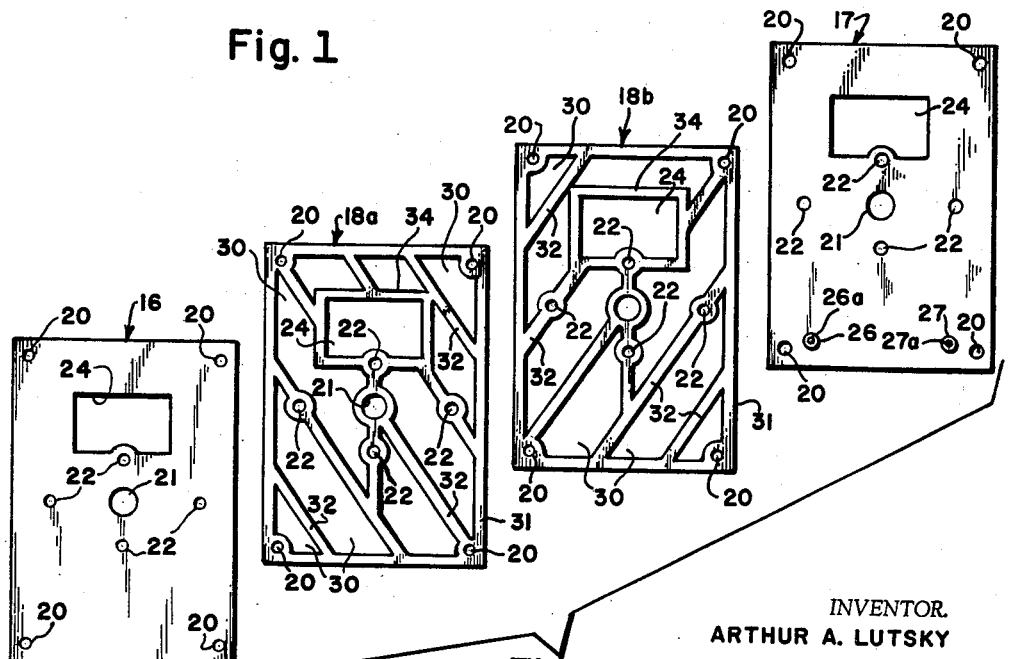
FIG. 3 is an exploded view, on smaller scale, of components of the thermal sensing element of FIG. 1.

Referring now to FIG. 3, end plates 16 and 17 are substantially identical and are preferably formed as sheet metal stampings from cold rolled steel. Each of the end plates 16 and 17 are provided with corner openings 20, a central control shaft opening 21, a series of switch mounting openings 22 surrounding shaft opening 21, and a generally rectangular window 24 for permitting adjustment of the control switch. In addition, end plate 17 is provided with a pair of nipples 26 and 27 which are suitably secured in openings in the plate by upsetting or brazing and provide passages 26a and 27a therethrough. Nipple 26 is adapted to have a filler tube 28 secured therein, while nipple 27 is adapted to receive tube 11 leading to bellows 12a.

Grid-like intermediate plates 18a and 18b are preferably formed as identical sheet metal stampings having openings 20, 21, 22, and windows 24, corresponding to those of plates 16 and 17. Plates 18a and 18b, however, are provided with additional openings or discontinuous areas 30 defined by a rectangular frame 31 and a plurality of diagonally extending bars 32. A smaller rectangular frame 34 defines the window 24 and interrupts several of the diagonal bars 32 as shown. The diagonal bars 32 and included openings 30 provide an asymetrical open work pattern so that when one of the plates 18b is reversed, as shown in FIGS. 3 and 4, prior to sandwiching between end plates 16 and 17, the diagonal bars and spaces cross one another.

Plates 16, 17, 18a and 18b have a thin coating of copper, such as may be formed by electroplating, so that when the plates are stacked or superimposed in the order shown in FIGS. 3 and 4 subjected to a sufficient temperature in a furnace or oven to melt the copper, the mating surfaces thereof will be brazed together to form an integral unit. Of course other materials than steel may be used to form the plates and they may be joined by other bonding materials such as solder or the like, depending upon the circumstances in which the sensing element will be used. When the grid members 18a and 18b are so bonded between end plates 16 and 17 the intersecting diagonal openings 30 interconnect to form a continuous chamber or cavity in communication with passages 26a and 27a leading to filler tube 28 and bellows connecting tube 11. The crossed diagonal bars of each of the grid-like members 18a, 18b act as spacers for one another between end plates 16 and 17, so that the fluid or fluid pressure may be transmitted over and under the bars between the end plates as shown by the arrows in FIG. 4.

The ratio of fluid volume to wall area of the chamber so formed is small compared to that of conventional bulb type sensing elements, and it has been found that although the sensing element 10 be formed of a material of lower thermal conductivity than the copper usually used in bulb type elements, the thin layer of fluid within the chamber confined by the relatively large heat transmitting wall area of the chamber results in more sensitive and rapid response of the fluid to temperature changes than has been possible heretofore.

Moreover, when the component plates are bonded together each of the intersections 35 formed by crossing bars 32 provide a solid connection between the end plates 16 and 17. End plates 16 and 17 are therefore not only reinforced by bonding to the diagonal bars, but are also rigidly held by a well distributed pattern of solid connections which preclude any likelihood of flexing of the end plates under the influence of varying external and internal pressures.

When the plates 16, 17 and 18 are assembled and bonded, the openings 20, 21 and 22 and windows 24 are aligned to accommodate screws 36 for mounting sensing element 10 on a wall or panel 14, switch mounting screws 37, and switch control shaft 38 on which a suitable knob 38a may be mounted. Wall or panel 14 may form part of a thermostatically controlled device such as a room heater or cooler, oven, refrigerator, or the like, or part of a thermostat housing for mounting on the wall of a room or enclosure to be tempered. Window 24 may be aligned with an opening in panel 14, normally covered by knob 38a, and provides access to one or more adjusting screws 39 for calibrating or otherwise varying the characteristics of control switch 12. Because the described construction permits the control shaft 38 to project through the sensing element 10 and between portions of the fluid chamber or cavity and because the sensing element may be made in many configurations other than rectangular and with many different forms of overlapping openwork patterns in the intermediate plates, there is provided a particularly versatile and compact control assembly which can take advantage of the small space allowed in modern appliances for control means.

Although the sensing element 10 has been described and illustrated as comprising two grid-like plate members 18a and 18b it will be understood that one or more additional grid-members may be included to vary the volume of the chamber formed between the end plates, or that the thicknesses of the members 18a, 18b may be varied for that purpose.

Referring now to the embodiment of the invention illustrated in FIGS. 5, 6 and 7, a thermal sensing element 40 comprises a pair of chamber defining plates 41 and 42 each of which has been formed by stamping or the like to provide a U-shaped embossment 44 bordered by a flat edge 45 and having a flat web portion 46 disposed between the legs of the U-shaped embossment. Plates 41 and 42 are disposed with their edges 45 and webs 46 in mating engagement with the mating surfaces bonded together by solder, brazing or the like, so that the embossments 44 provide a U-shaped chamber for a thermally expansible fluid. A bellows operated switch mechanism 50 having a bellows 50a may be secured to the sensing element 40 by screws 51 extending through openings in the webs 46, with a control shaft 52 extending through an opening 46a in the webs. A notch 46b is formed in the webs 46 to provide access to one or more adjusting screws 48 for varying the characteristics of switch mechanism 50. Switch mechanism bellows 50a is connected by a capillary tube 50b to a nipple 50c providing a passage 54 communicating with the interior of U-shaped chamber 47. A filling tube 58 is secured in a nipple 58a providing communication with chamber 47, the filler tube 58 being sealed closed as at 59 after charging the sensing element chamber 47, tube 50b, and bellows 50a with a suitable expansible fluid. Plate 41 is provided with laterally extending lugs 60 which permit the convenient attachment of sensing element 10 and its associated switch mechanism 50 to a panel 61, which may form part of thermostatically controlled devices such as those mentioned with reference to panel 10.

The embossments 44 have generally flat wall surfaces 44a which provide good heat conducting contact between the sensing element and wall 61 and also provide a large wall area to fluid volume ratio resulting in a particularly responsive sensing element.

In some instances it is desirable to mount the control device (of an oven for example) at some position remote from the sensing element which is within the oven compartment. FIG. 8 illustrates how a modified thermal sensing element 65 which, like element 10, comprises a set of grid-like plates bonded between end plates to form a cavity, may be flush mounted in an oven. The control shaft openings, switch mounting openings and adjusting window have been omitted, and the sensing element is mounted in a recess 66a formed in an oven wall 66 with the exposed surface of the element being flush with the wall. A tube 66b extends through the oven wall and leads to the expansible bellows of a remotely mounted control device. It will be understood that a similarly modified form of sensing element 40 may likewise be flush mounted within an oven to operate a remote control device. The flush mounting permitted by a sensing element of this invention contributes to additional usable space in ovens, and to ease in cleaning the oven walls, there being no intruding tubes, bulbs, and retainer to make that task more difficult.

Figure 9:
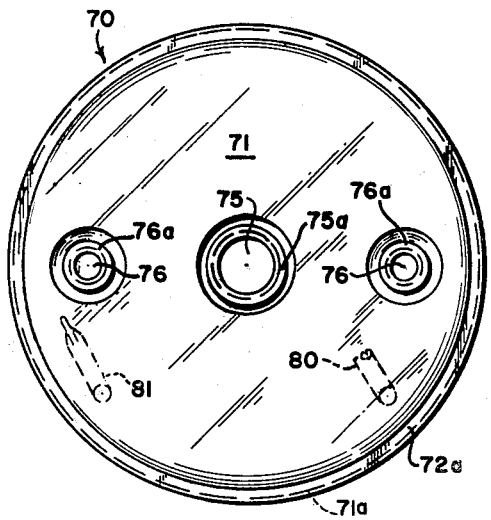
FIG. 9 is a front elevation of another embodiment of composite thermal sensing element.
Figure 10:
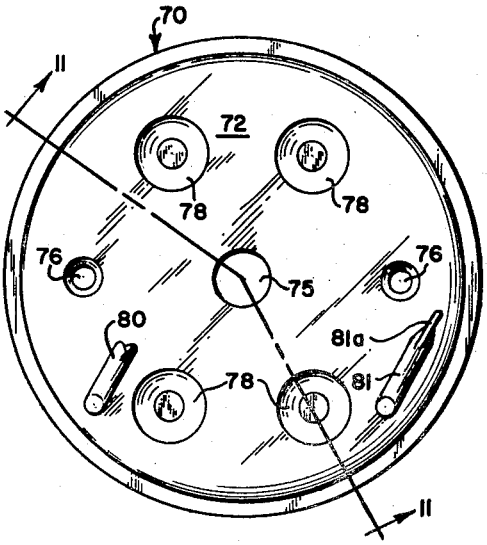
FIG. 10 is a rear elevational view of the sensing element of FIG. 9.
Figure 11:
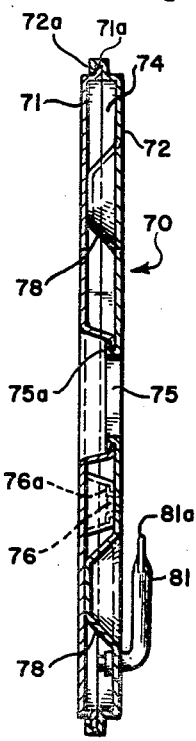
FIG. 11 is a sectional view taken substantially along line 11—11 of FIG. 10.

FIGS. 9, 10 and 11 illustrate still another embodiment of the present invention in the form of a generally circular sensing element 70. In this instance, the sensing element 70 comprises a pair of chamber defining circular plates 71 and 72, each of which has been shaped by stamping or the like so that, when assembled, there is formed an annular chamber 74 surrounding a central opening 75 for receiving the control shaft of a control device similar to device 12, which may be secured to the sensing element by fasteners extending through openings 76 therein. Plate 72 has an annular rim or edge 72a which is rolled inwardly over the edge 71a of plate 71 as is best shown in FIGS. 9 and 11. In addition, plate 72 has a neck portion 75a extending through the center opening of plate 71 and rolled over the edge thereof to form a seal about the opening 75. Likewise, the openings 76 are formed by neck-like portions 76a of plate 72 which project through openings in plate 71 and are rolled over the edges thereof.

Plate 72 is dimpled inwardly to provide a plurality of inwardly directed projections 78 which serve as spacers between the plate 71 and plate 72 to prevent distortion of the chamber 74 formed therebetween. A capillary tube 80 is brazed in an opening in plate 72 so as to communicate with the interior of sensing element 70 and leads to the bellows or other expansible element of the mentioned control device which may be similar to control device 12. A filling tube 81 is likewise brazed in an opening in plate 72 and is sealed as at 81a after the sensing element 70, capillary tube 80, and expansible element of an associated control device are charged with a suitable expansible fluid.

The entire sensing element 70 may be conveniently soft or silver soldered, or may be copper brazed in the same manner as described with reference to sensing element 10, so as to seal all mating surfaces between plates 71 and 72.

Although the invention has been described with detailed reference to several specific embodiments thereof, it is understood that the invention is not limited thereto, but rather the invention includes all those modifications, alterations, and changes of shape and uses as are embraced by the scope of the following claims.

Having thus described my invention, I claim:

1. A thermal sensing element comprising a pair of rectangular end plates, a pair of rectangular intermediate plates bonded together and between said end plates, said intermediate plates each having a series of diagonal openings defined by a peripheral frame and a series of diagonal bars, one of said intermediate plates being superimposed on the other of said intermediate plates with the diagonal openings and bars of the one in crossing relation to the diagonal openings and bars of the other so as to form a continuous single chamber between said end plates, and a passage communicating between the chamber and the exterior of said sensing element.

2. A sensing element as defined in claim 1, and wherein said intermediate plates and said end plates comprise aligned openings to form an opening through said sensing element for receiving a control shaft of a control device.

3. A sensing element as defined in claim 1 wherein the intersections formed by crossing of the bars provide a pattern of solid connections between said end plates which resist flexing of the end plates upon changes in pressure differences between the chamber and the exterior of the sensing element.

4. A thermal sensing element comprising a plurality of parallel extending superimposed plate members including two end plate members and defining a cavity for fluid, said plate members each presenting surface areas in contiguous bonded relation with surface areas of another of said plate members, said surface areas all lying in planes parallel with said plate members, a portion of said surface areas being disposed along the edges of said plate members and surrounding said cavity, and portions of said surface areas providing interconnection of said end plate members within said cavity, portions of each of said plate members defining openings which are aligned to provide a control shaft opening through the sensing element, said control shaft opening being disposed between portions of the cavity defined by the plate members, and a passageway defined in one plate member to provide communication with said cavity.

5. A thermal sensing element as defined in claim 4 and wherein said cavity comprises an annular space surrounding said control shaft opening.

6. A thermal sensing element comprising a pair of rectangular end plates, first and second rectangular intermediate plates sandwiched between said end plates, said intermediate plates being identical and each having a series of openings in an asymmetrical pattern, said openings being in the form of diagonal slots separated by diagonal bars, said intermediate plates being superimposed with one having its pattern reversed with respect to the other so that the openings intersect one another to form a continuous cavity between said end plates, and means defining a passage communicating between said cavity and the exterior of said sensing element.

7. A thermal sensing element comprising a plurality of superimposed plate members defining a cavity for fluid, portions of each of said plate members defining openings which are aligned to provide a control shaft opening through the sensing element, said cavity being formed of intersecting openings in intermediate plate members bonded between end plate members, said control shaft opening being disposed between portions of the cavity defined by the plate members, and a passageway defined in one plate member to provide communication with said cavity.

8. A thermal sensing element comprising a plurality of superimposed plate members defining a cavity for fluid, portions of each of said plate members defining openings which are aligned to provide a control shaft opening through the sensing element, said cavity being U-shaped and said control shaft opening being disposed in web portions of the plate members extending between leg portions of U-shaped embossments defining the cavity.

9. A thermal sensing element comprising a plurality of parallel extending superimposed plate members including two end plate members defining a cavity for fluid, said plate members each presenting surface areas in contiguous bonded relation with surface areas of another plate member, said surface areas lying in planes parallel with said plate members, a portion of said bonded surface areas being disposed along the edges of said plate members and surrounding said cavity, and another portion of said bonded surface areas providing interconnection of said end plates within said cavity, and a passage defined in one plate member to provide communication with said cavity.

10. A thermal sensing element comprising a pair of end plates each presenting an inwardly directed plane surface, a plurality of flat intermediate plates superimposed on one another and sandwiched between said end plates, said intermediate plates each having at least one discontinuous area in partially overlapping relation with a discontinuous area of another intermediate plate, said superimposed intermediate plates having all contiguous areas bonded together and presenting two outwardly directed plane surfaces each being bonded throughout its area to one of said inwardly directed surfaces of said end plates, whereby said discontinuous areas form a chamber defined only by said end plates and said intermediate plates, and a passage leading from said chamber through one of said end plates.

11. A thermal sensing element of the character described comprising a pair of relatively flat end plates closely spaced in face to face relation and hermitically joined about the peripheries thereof to provide a relatively thin, widespread cavity, means disposed between said plates forming discontinuous areas of engagement with said plates intermediate the edges thereof and being bonded to said plates at said areas to resist expansion or contraction movements of said plates, conduit means leading from said cavity, and a body of thermally responsive fluid contained within said cavity.

12. A thermally responsive control mechanism including a housing supporting a control device, said device including an adjusting shaft extending from one side thereof, a thermally responsive element comprising a pair of relatively flat plates arranged in close face to face relation and having the edge portions thereof bonded together to form an hermetic seal therebetween for providing a relatively thin widespread cavity, thermally responsive fluid within said cavity, said plates having aligned openings therethrough for receiving said adjusting shaft, the edges of said openings being bonded to form a fluid tight seal and means to support said control housing on one side of said element.

References Cited in the file of this patent
UNITED STATES PATENTS

| | | |
|---|---|---|
| 1,106,451 | Isenhour | Aug. 11, 1914 |
| 1,359,107 | Roesch | Nov. 16, 1920 |
| 2,572,446 | Carson | Oct. 23, 1951 |